April 9, 1929.                M. TIBBETTS                1,708,708
MOTOR VEHICLE INDICATOR
Filed Nov. 30, 1923
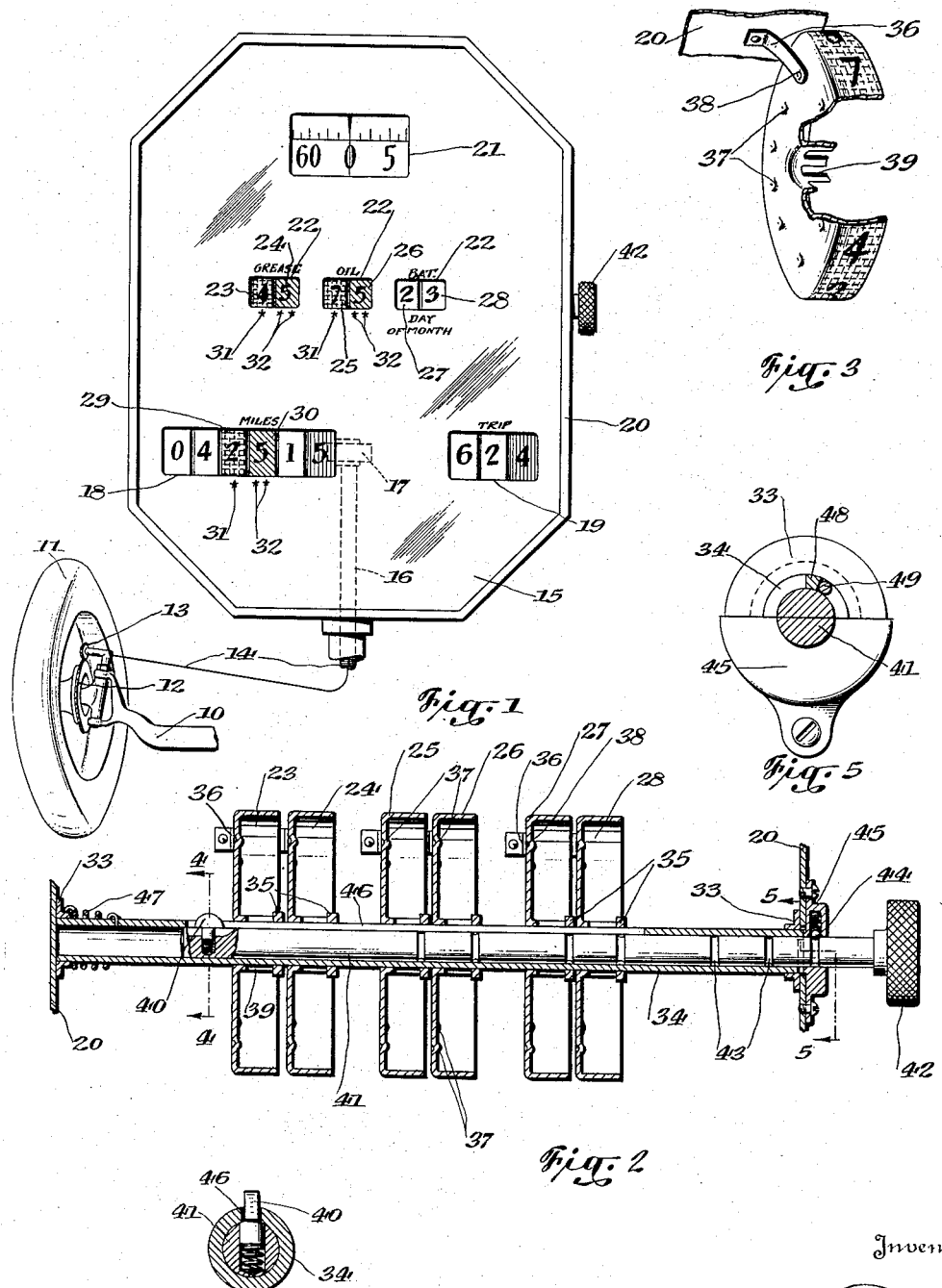
Inventor
Milton Tibbetts Patented Apr. 9, 1929.

1,708,708

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE INDICATOR.

Application filed November 30, 1923. Serial No. 677,620.

This invention relates to motor vehicles and particularly to odometer and indicator mechanism therefor.

In the operation of a motor vehicle it is extremely important that certain operations shall be performed on the vehicle at stated intervals of either miles or time. For instance, it is extremely important that various parts of the vehicle shall be supplied with grease, such parts, for instance, as the spring shackles and steering connections. These parts should under ordinary circumstances be given a supply of grease every two hundred miles. It is important also that the oil in the crankcase of the engine shall be either changed or a new supply added at certain mileage intervals, say every five hundred miles. The storage batteries of the vehicles should also be attended to periodically. This is not a question of miles but of time as the water evaporates from the battery and should be replenished every two or three weeks. There are other operations that are necessary but these three are sufficient for an understanding of the present invention.

It is extremely difficult for the operator of a motor vehicle to remember just when these operations should be performed. Particularly is this difficult if several persons are driving the same car at different times.

One of the objects of the present invention is to provide an odometer mechanism with means for indicating at all times just when certain of these required operations are due, and just how far off in miles or time that due date is.

Another object of the invention is to provide mileage and date indicators in the same instrument so that the mileage and date of the next following operations may be readily observed.

Other objects of the invention will appear from the following description taken in connection with the drawings, which form a part of this specification, and in which:

Fig. 1 is an elevation of an odometer mechanism and a somewhat diagrammatic view of parts of a motor vehicle, embodying the invention;

Fig. 2 is an enlarged sectional view of the number wheels and supporting mechanism of the indicator device;

Fig. 3 is an enlarged perspective view of one of the number wheels shown in Fig. 2;

Fig. 4 is an enlarged section on the line 4—4 of Fig. 2; and

Fig. 5 is an enlarged view partly in section and partly in elevation, on the line 5—5 of Fig. 2.

Referring to the parts of a motor vehicle which are illustrated in Fig. 1, the vehicle may be represented by the axle 10 and the wheel 11 thereon. Upon the wheel is a gear 12 which operates a small pinion 13 connected to a flexible shaft 14 which extends from the axle to the dash or cowl of the vehicle. Upon the dash or cowl the odometer mechanism 15 is mounted and the shaft 14 runs to this mechanism and operates parts of it as shown by the dotted line shaft 16 and the gear 17. This shaft and gear operate an odometer indicated generally at 18, the gross miles being indicated under the heading "miles" and the trip miles being indicated under the heading "trip". The trip part of the odometer is indicated also at 19. This odometer is of the usual or conventional type and need not be further described except as to certain special features which will be later referred to. It comprises several number wheels which are so interconnected that a full rotation of the right-hand wheel moves the next adjacent wheel one-tenth of a revolution and so on throughout the six wheels shown in the odometer 18. The odometer 19 is similar to the other except that there are only three number wheels and this one is adapted to be set by hand to any desired figure. After being set the trip indicator operates with the other odometer to indicate the miles traveled from that point on. In both of the odometers the right-hand number wheel is usually provided with a red back-ground to indicate tenths of a mile and ordinarily the other wheels are white with black figures or black with white figures.

This odometer mechanism is mounted upon or in a suitable support or casing 20 with suitable openings for observing the number wheels of the odometers 18 and 19. Its face plate is also provided with an opening 21 through which the speedometer part of the device may be observed. As the speedometer forms no part of the invention it will not be further described.

The face plate of the casing 20 is also provided with several additional openings 22 adjacent the odometer 18 and at these openings the indicator device of this invention is located.

The indicator device, as shown herein, comprises six number wheels, 23, 24, 25, 26, 27, 28, on the periphery of each of which the numbers 0 to 9 are arranged as on the number wheels of the odometer 18. The number wheel 23 is shown as colored yellow as is also the hundredths number wheel of the odometer 18, as shown at 29. The same is true of number wheel 25. Number wheels 24 and 26 are shown as colored green as is also the tenths number wheel of the odometer 18 as shown at 30. Thus the number wheels 23 and 25 correspond to the hundredths wheel 29 of the odometer 18 and number wheels 24 and 26 correspond to the tenths number wheel 30 of the odometer 18.

As a further means for showing the correspondence between these various number wheels, a symbol may be used and marked on the face plate of the casing 20 adjacent the various number wheels. As shown for instance, there is a single star 31 adjacent number wheels 23, 25 and 29 and there are two stars 32 adjacent number wheels 24, 26 and 30.

In order that these indicator devices may be used for the particular purposes intended, it is desirable to mark such words as "Grease" adjacent the wheels 23 and 24 and "Oil" adjacent the wheels 25 and 26. This marking is preferably done on the face plate of the casing 20, as shown in Fig. 1 of the drawing.

The number wheels 27 and 28 may or may not be colored as desired but they do not necessarily correspond with any of the number wheels of the odometer 18. Adjacent these number wheels 27 and 28 the word "Battery" or its abbreviation "Bat." may be printed and if desired the words "Day of month" may be printed under them, as shown in the drawing.

In Fig. 2 of the drawing the casing 20 and the number wheels 23 to 28 are shown in section and as somewhat enlarged. The casing is provided with two oppositely disposed brackets 33 in which is mounted a hollow shaft 34 upon which the number wheels 23 to 28 are mounted as shown. The shaft 34 is provided with several spaced abutment rings 35 which are soldered or otherwise secured to the shaft. The number wheels are lightly pressed against these abutment rings 35 by means of spring fingers 36, secured to the inner face of the casing 20 as shown in Figs. 2 and 3. Each of the number wheels is provided with ten spaced depressions 37 corresponding to the ten numerals on the face of each wheel and a rounded knob 38 at the end of each finger 37 yieldingly retains the wheels in their set position.

The hub of each of the number wheels is formed with a series of teeth forming recesses 39 and a spring actuated plunger 40 mounted as shown in Fig. 2 in the end of a rod 41 in the tubular shaft 34 is adapted to engage said spaces 39 and thereby rotate the number wheel. The rod 41 has a thumb piece 42 on its projecting end so that it may be moved endwise and rotated by hand. The rod 41 is provided with annular grooves 43, spaced as shown, and a spring plunger 44 arranged in a bracket 45 secured to the outside of the casing 20 operates in said grooves 43 to temporarily retain the rod 41 in position for rotating a particular number wheel. The plunger 40 operates in a slot 46 which is formed in the shaft 34 and it is rounded off as shown particularly in Fig. 2 so that it will be depressed slightly in passing under the rings 35. A coil spring 47 is shown at the left-hand end of the shaft 34 for yieldingly rotating the shaft in one direction. A stop 48 on the bracket 45 acts in conjunction with a pin 49 on the shaft 34 to limit the rotary movement of the shaft.

From the above it will be seen that any one of the numbering wheels 23, 24, 25, 26, 27 or 28 may be set to desired position by pulling the rod 41 outwardly until the plunger 40 engages the desired wheel and then rotating the rod against the action of the spring 47 until the wheel reaches the desired set position. The rod is then pushed inwardly until it reaches the position shown in Fig. 2 and the spring 47 will then return it to its original position. In the meantime the spring fingers 37 retain all of the other wheels in their set positions.

The operation of the odometer mechanism as a whole may be described as follows: We will assume that it is desirable to grease the vehicle every two hundred miles, to renew the oil in the crankcase every five hundred miles, and add water to the battery every three weeks. We will assume also that these things have just been done on the vehicle and the mileage is as shown on the odometer 18 in Fig. 1, that is, 4251.5 miles. We will assume further that this was done on the second day of a given month.

With the above assumptions in mind the operator will set the grease indicator at 4—5, the oil indicator at 7—5, and the battery indicator at 2—3. Then at any time thereafter the operator will know just how many miles he may go (omitting the unit miles below ten) before he should again grease the car, and before he should again renew the oil, and he will know the day of the month when he should put more water in the battery. Thus, as soon as the odometer reading reaches 4450 it will be time to grease; when it reaches 4750 it will be time to renew the oil; and when the 23rd of the month comes around it will be time to put water in the battery. If the operator runs over the mileage indicated by the indicator devices, he will be constantly reminded of that fact every time he looks at the odometer and he will know just how much chance he is taking and how much injury he is doing the car. When any one of the three operations is performed on the car the particular indicator is again set for the next mileage indication or date indication.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of an odometer operated by the movement of the vehicle, and a hand set indicator device having number wheels corresponding in appearance to some of the number wheels of the odometer, said device being adapted to remain in its set position as the odometer operates.

2. In a motor vehicle, the combination with an odometer operated by the vehicle and adapted to indicate miles traveled, of an indicator device arranged adjacent the odometer and adapted to remain stationary as the odometer figures move, said indicator device having a part corresponding in appearance to a part of the odometer and means for hand setting the figures of said device.

3. In a motor vehicle, the combination with an odometer driven by the vehicle and having a number wheel of different appearance from the other wheels of said odometer, of an indicator device arranged adjacent said odometer and having a number wheel corresponding to the said number wheel of the odometer, means for retaining said device in set position as the odometer operates, and means for hand setting said device.

4. In an odometer mechanism, the combination with an odometer having one of its number wheels colored differently from the others, of an indicator device adapted to remain stationary as said odometer mechanism operates, and having a number wheel corresponding in color to the colored wheel of said odometer, and means for setting said device by hand.

5. In an odometer mechanism, the combination of an odometer having several number wheels of differing colors, an indicator device mounted adjacent the odometer and having a set of number wheels corresponding in color to some of the number wheels of said odometer, means for retaining the number wheels of said device stationary while the odometer wheels operate, and means for hand setting the number wheels of said device.

6. In an odometer mechanism, the combination of an odometer having different color number wheels, an indicator device having two or more series of number wheels each series having wheels corresponding in color to several of the wheels of said odometer, means for retaining the number wheels of said device stationary while the odometer wheels operate, and means for hand setting said device.

7. In an odometer mechanism, the combination of an odometer having several number wheels, an indicator device mounted adjacent the odometer and having several indicator wheels, and a symbol arranged to indicate correspondence between certain wheels of the odometer and certain wheels of the indicator device.

8. In an odometer mechanism, the combination of an odometer having tenths and hundredths wheels, an indicator device having two independently operable number wheels, a symbol for the tenth wheel of said odometer and for one of the wheels of said device, and another symbol for the hundredths wheel of said odometer and the other wheel of said device.

9. An indicator device comprising a support, a rotatable shaft mounted in said support, a spring for yieldingly rotating said shaft in one direction, a stop to limit the rotation of said shaft, a plurality of number wheels mounted on said shaft, means for yieldingly retaining each of said number wheels in set position, and means for connecting said wheels one at a time to said shaft for rotating the wheels.

10. In an indicator device, the combination of a tubular shaft, a plurality of number wheels mounted thereon, a rod slidable within said shaft and having means to engage each of said wheels independently of the others, and means for sliding said rod in said shaft and turning said wheels independently.

11. In a motor vehicle, the combination with an odometer driven by the vehicle and having differently colored number wheels, of an indicator device having number wheels colored to correspond with some of the number wheels of the odometer, and means for setting the indicator device to indicate the future mileage of the vehicle at which certain attentions should be given thereto.

12. In an indicating device, the combination of a tubular support, a plurality of number wheels supported thereby, a rod slidable relative to the support, means on the rod for selectively engaging the wheels and means for manipulating the rod for independent rotation of the wheels.

13. In an indicator, the combination of a tubular shaft, a plurality of number wheels mounted relative thereto, a rod slidable and rotatable within the shaft, means on the rod for selectively engaging the wheels and means for sliding and rotating the rod to rotate the wheels independently.

In testimony whereof I affix my signature.

MILTON TIBBETTS.